(12) United States Patent
Harel

(10) Patent No.: US 9,285,899 B2
(45) Date of Patent: Mar. 15, 2016

(54) DATA ENTRY DEVICE UTILIZING WRITING IMPLEMENT ROTATION

(75) Inventor: Jacob Harel, San Mateo, CA (US)

(73) Assignee: PNF CO., LTD., Belmont, CA (US)

( * ) Notice: Subject to any disclaimer, the term of this patent is extended or adjusted under 35 U.S.C. 154(b) by 2078 days.

(21) Appl. No.: 12/372,285

(22) Filed: Feb. 17, 2009

(65) Prior Publication Data

US 2010/0206645 A1 Aug. 19, 2010

(51) Int. Cl.
*G06F 3/033* (2013.01)
*G06F 3/0354* (2013.01)

(52) U.S. Cl.
CPC ........ *G06F 3/03545* (2013.01); *G06F 3/03542* (2013.01)

(58) Field of Classification Search
USPC .................................. 345/156, 166, 179, 182
See application file for complete search history.

(56) References Cited

U.S. PATENT DOCUMENTS

| | | | |
|---|---|---|---|
| 6,118,204 A * | 9/2000 | Brown | 310/303 |
| 6,118,205 A * | 9/2000 | Wood et al. | 310/316.01 |
| 6,335,723 B1 * | 1/2002 | Wood et al. | 345/173 |
| 6,414,673 B1 * | 7/2002 | Wood et al. | 345/173 |
| 6,664,954 B1 * | 12/2003 | Yoshimura et al. | 345/179 |
| 6,900,791 B2 * | 5/2005 | Tanaka et al. | 345/156 |
| 7,342,350 B2 * | 3/2008 | Toda | 310/334 |
| 2001/0000666 A1 * | 5/2001 | Wood et al. | 345/179 |
| 2006/0082546 A1 | 4/2006 | Wey | 345/156 |
| 2008/0165162 A1 | 7/2008 | Zloter et al. | 345/179 |
| 2008/0169132 A1 * | 7/2008 | Ding et al. | 178/19.02 |
| 2009/0278794 A1 * | 11/2009 | McReynolds et al. | 345/156 |

FOREIGN PATENT DOCUMENTS

| | | |
|---|---|---|
| JP | 1999-203043 A | 7/1999 |
| JP | 2004-227063 A | 8/2004 |
| WO | WO 2004-114112 A1 | 12/2004 |

OTHER PUBLICATIONS

International Search Report, PCT/US2010/022142, Sep. 14, 2010, all pages.
Preliminary Report on Patentability, PCT/US2010/022142, Sep. 1, 2011, all pages.

* cited by examiner

*Primary Examiner* — Kumar Patel
*Assistant Examiner* — Afroza Chowdhury
(74) *Attorney, Agent, or Firm* — Kile Park Reed & Houtteman PLLC

(57) ABSTRACT

A writing implement and system using that writing implement are disclosed. The writing implement includes a pen having an elongated body with a plurality of light sources arranged around an outer surface of the body. Each light source has a unique identity. A pen controller that activates each light source to emit light such that the identity of that source can be ascertained by a detector external to the pen. The number of light sources is greater than or equal to 2, and the light sources are arranged such that at least one of the light sources is visible to a detector external to the pen at any time. The detector can then determine the angle of rotation of the pen relative to a fixed reference direction.

27 Claims, 2 Drawing Sheets

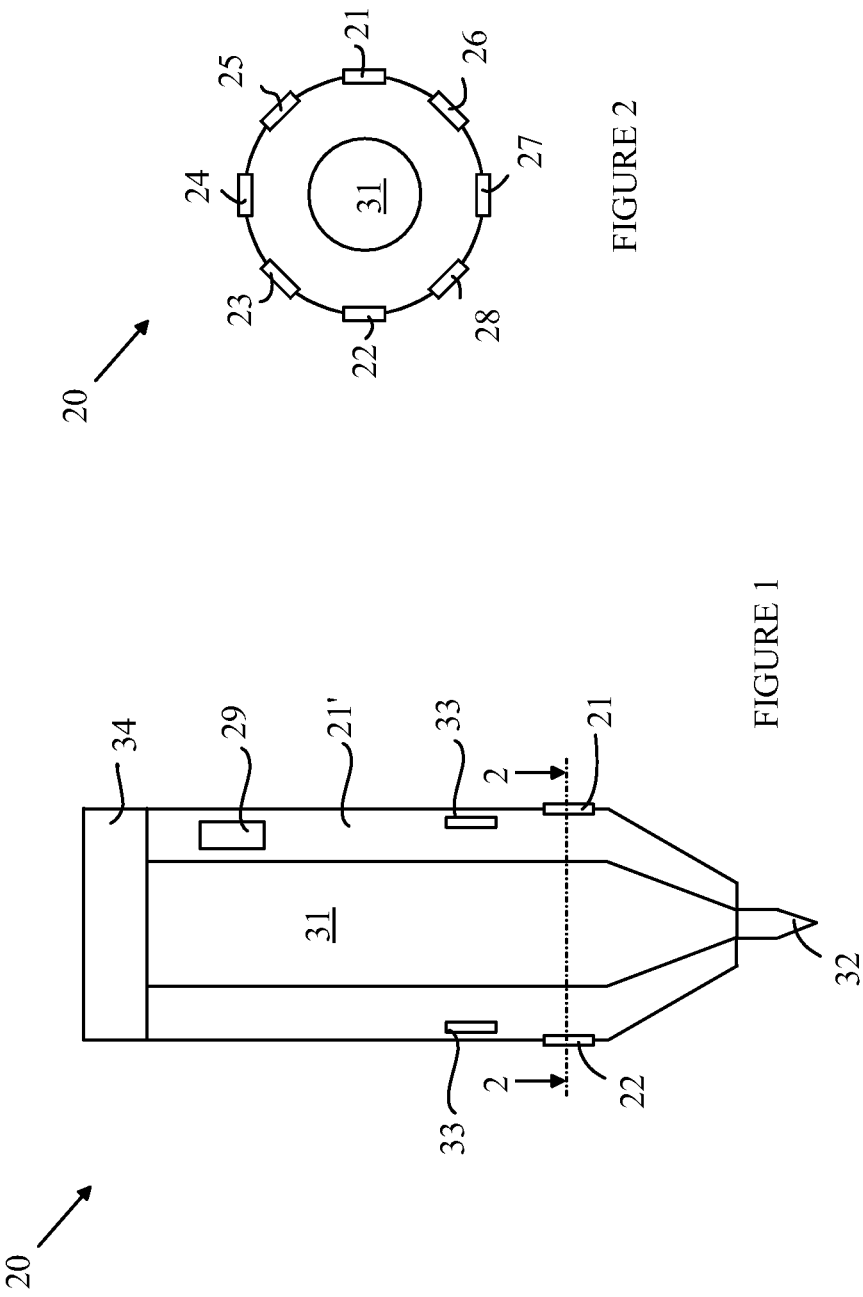

DATA ENTRY DEVICE UTILIZING WRITING IMPLEMENT ROTATION

BACKGROUND OF THE INVENTION

While the mouse is an excellent solution to the problem of controlling the motion of a cursor on the computer screen, it is poorly suited for simulating a writing implement such as a pen that can be used to input handwriting and the like. A number of pen-like pointing devices have been introduced to fill this need. One class of pen devices uses a stylus or similarly shaped object that is held like a pen such that its end moves over a special surface. The position of the pen on the surface is detected by sensors associated with the surface, and the position data is sent to the data processing system attached to the device. While such devices more nearly emulate a pen, they require a special writing surface that includes the sensors needed to track the stylus's motion. The cost of such systems is much greater than the cost of an optical mouse, and hence, these systems have not found wide spread acceptance. In addition, the tablets on which the user "writes" are of a fixed size. If the tablet is large, it is not suitable for portable computers. Similarly, if the tablet is small, the amount of data that can be written is significantly reduced.

Systems based on tracking the location of the pen on a surface such as a white board are also known to the art. These systems determine the position of the pen with the aid of two receivers that are placed on or near the writing surface. The pen includes an ultrasound transmitter and an infrared transmitter. Each of the receivers includes a matching ultrasound receiver and infrared receiver. When the pen makes contact with the writing surface, an ultrasound pulse and an infrared pulse are emitted by the pen. Each of these signals is detected by the receivers. By comparing the difference in arrival times of the infrared pulse and ultrasound pulse at each of the receivers, the location of the pen can be ascertained.

This basic tracking system does not, however, provide any information with respect to the rotation position of the pen. In some applications, observing the rotation of the pen can be useful. For example, the user could rotate the pen in a predetermined direction to signal an event such as a mouse click. A rotation in one direction could implement a right button click and a rotation in the other direction could implement a left button click.

SUMMARY OF THE INVENTION

The present invention includes a writing implement and system having a pen that includes an elongated body having a plurality of light sources arranged around an outer surface of the body, each light source being characterized by a unique identity, and a pen controller that activates each source to emit light such that the identity of that source can be ascertained by a detector external to the pen. The number of light sources is greater than or equal to 2, and the light sources are arranged such that at least one of the light sources is visible to the detector at any time.

In one aspect of the invention, the pen includes an acoustical transmitter that emits a sound pulse in response to a signal from the pen controller. The signal can be utilized together with light signals from one or more of the light sources to determine the position of the pen relative to two receivers.

In another aspect of the invention, the elongated body includes a cavity adapted for holding a writing implement having a writing tip that extends from the cavity.

In another aspect of the invention, the pen controller activates the light sources one at a time in a predetermined order. The identity of each light source can be coded in the light signal from each light source by modulating each light source with a unique code when that light source is activated.

In another aspect of the invention, the pen controller activates all of the light sources simultaneously, each light source being modulated with a unique code that can be detected even in the presence of the light from the other of the light sources.

The pen can be utilized in a system having a first light receiver that includes a photodetector adapted to receive light from the light sources and a receiver controller that measures an intensity of light received from a first one of the light sources. The receiver controller determines the identity of that light source and estimates an angle of rotation of the pen relative to a predetermined direction on a writing surface. In one aspect of the invention, the receiver controller measures an intensity of light received from a second one of the light sources, determines the identity of that light source, and utilizes that measured intensity in providing the estimate of the angle of rotation.

In another aspect of the invention, the system includes a second light receiver that includes a photodetector adapted to receive light from the light sources, the second light receiver being displaced relative to the first light receiver such that the second light receiver receives light from a second one of the light sources that is different from the first one of the light sources. The receiver controller measures an intensity of light received from the second one of the light sources and utilizes that measurement in generating the estimate of the angle of rotation.

In a still further aspect of the invention, the first and second light receivers comprise sound receivers that detect sound pulses generated by the pen. The receiver controller determines a position of the pen relative to the first and second light receivers from the received sound pulses.

In yet another aspect of the invention, the number of light sources is reduced to a single light source that emits light in a pattern that varies as a function of a rotation angle with respect to a reference direction in a plane perpendicular to the elongated body. The variation in intensity over time is then used to determine an estimate of the rotation angle and/or the rotation direction.

BRIEF DESCRIPTION OF THE DRAWINGS

FIG. 1 is a cross-sectional view of a pen 20 through an axial plane.

FIG. 2 is a cross-sectional view of pen 20 through line 2-2 shown in FIG. 1.

DETAILED DESCRIPTION OF THE PREFERRED EMBODIMENTS OF THE INVENTION

Figure 3:
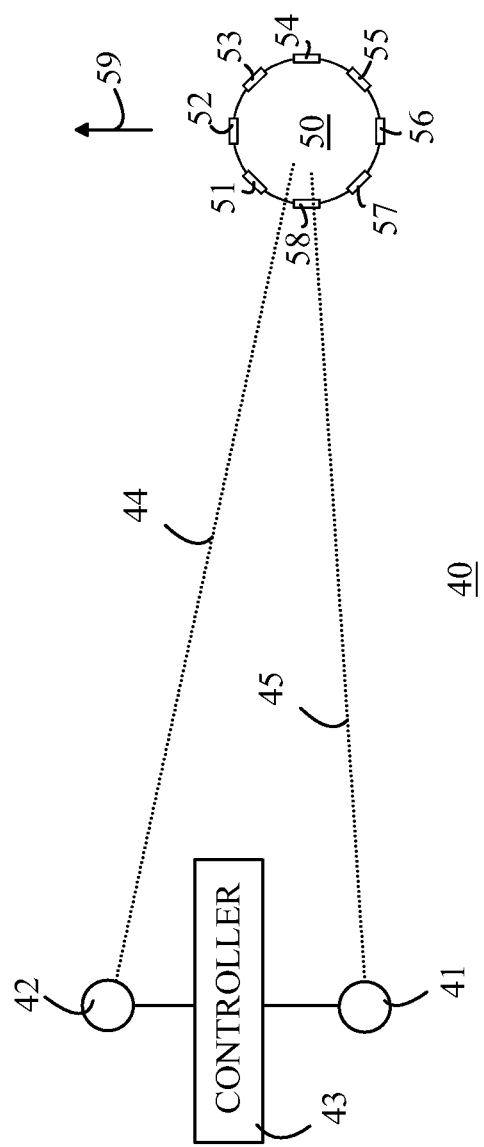
FIG. 3 illustrates the manner in which a pen 40 according to one embodiment of the present invention interacts with two receivers to provide both position and rotation information.

The manner in which the present invention provides its advantages can be more easily understood with reference to FIGS. 1 and 2, which illustrate the basic elements of a pen 20 according to one embodiment of the present invention. FIG. 1 is a cross-sectional view of the pen through an axial plane, and FIG. 2 is a cross-sectional view of the pen through line 2-2 shown in FIG. 1. Pen 20 includes a body 21' that has a cavity in which a white board marker 31 can be inserted such that the tip 32 of the marker extends from body 21' and can be used to write on a white board or the like. The marker is held in place by a cap 34, which also provides access to the cavity into which the marker is inserted. Body 21' also includes an ultrasound transducer 33 and a plurality of infrared transmitters 21-28. The ultrasound transducer can be constructed from a piezoelectric film. The infrared transmitters can be constructed from LEDs. The infrared transmitters and ultrasound transducer are under the control of a controller 29. To simplify the drawings, the connections between controller 29 and the other elements of pen 20 have been omitted.

Refer now to FIG. 3, which illustrates the manner in which a pen 50 according to one embodiment of the present invention interacts with two receivers to provide both position and rotation information. Pen 50 is used to write on a surface 40 such as a white board. Pen 50 is similar to pen 20 discussed above. Receivers 41 and 42 are located on or near writing surface 40. The position of pen 50 on writing surface 40 is repetitively determined by actuating the LEDs to send a light pulse at the same time the ultrasound transmitter sends a sound pulse. The light pulse is generated by actuating all of the LEDs simultaneously. The ultrasound pulse is omni directional.

Each of the receivers receives both the ultrasound pulse and the light pulse. By observing the difference in the time of arrival between the light pulse and the ultrasound pulse, each receiver can determine the distance from the receiver to the pen 50. The receivers are displaced from one another by a distance sufficient to allow controller 43 to determine and record the position of pen 50 on surface 40 by triangulation from the known positions of receivers 41 and 42.

The rotational position of the pen is determined by determining the identity of the light sources 51-58 that can be seen at each receiver and the relative intensities of the light signals from those light sources. In one aspect of the present invention, each of the light sources transmits light in a cone of angles that overlaps with the cone of angles transmitted by the neighboring light sources. Hence, each receiver receives light from at least two of the light sources on pen 50. For example, in the example shown in FIG. 3, receiver 42 receives light from light sources 51 and 58, and receiver 41 receives light from light sources 58 and 57. If a receiver can determine the identity of the light sources that are currently illuminating that receiver, then the receiver can determine the rotational position of pen 50. For example, if receiver 42 ascertains that receiver 42 is receiving light from light sources 51 and 58, then receiver 42 "knows" that it is positioned such that the line 44 from receiver 42 to pen 50 passes between light sources 51 and 58. This provides a rough estimate of the rotation of pen 50 with respect to some predetermined orientation 59. Similarly, if receiver 41 ascertains that receiver 41 is receiving light from light sources 58 and 57, line 45 must pass between the centers of light sources 58 and 57.

This estimate can be refined by observing the relative intensities of the light received at receiver 42 from each of the light sources and combining that information with the known position of pen 50 on surface 40. It is assumed that the radiation pattern of each of the light sources has been measured and stored in controller 43. The manner in which this information is input to controller 43 for any particular pen will be discussed in more detail below. Given the known distance from the receiver to pen 50, the expected intensity from each light source can be computed for any given angle of rotation relative to direction 59. Since the radiation patterns from each light source are symmetrical about the normal to the light source, controller 43 must determine on which side of the light source the line from the receiver to the light source passes. The identity of the second light source provides that information. In addition, the angle at which the user tilts the pen during writing can alter the amount of light that reaches each of the receivers. This factor can be removed by using the ratio of the light from the two LEDs rather than the absolute measured intensity of light. It should also be noted that the estimate of the rotation angle could be further refined by observing the relative intensities and the identity of the light sources that are visible from the second receiver.

The above-described method assumes that each receiver receives light from only two light sources. For some orientations, a receiver could receive light from three light sources. For example, in the example shown in FIG. 3, receiver 41 could receive light from light sources 51, 58, and 57. The relative intensities of the two weaker light sources provide information with respect to which side of light source 58 line 45 passes. It should be noted that if the intensities of light sources 51 and 57 are equal, than line 45 must pass through light source 58.

Similarly, depending on the number of light sources, a receiver might only receive light from one light source. In this case, the receiver can still generate an estimate of the rotation angle and/or a determination of the direction of rotation of the pen. The estimate in question will have a much larger uncertainty than an estimate based on two light sources; however, for some purposes, this estimate may be adequate. For example, consider the case in which the purpose of detecting the angle of rotation is to detect a rotational movement of the pen in one direction or another to implement "right click" or "left click" signal. If the rotation is sufficient to change the intensity of the light being detected from a single source, the system can determine in which direction the pen was rotated, and hence, implement the required function. The minimum number of light sources needed to function in this manner depends on the minimum rotation that is to be detected. If the minimum rotation is sufficiently large, a single light source could be utilized since the light source will be visible at the receiver for a portion of the rotation. If the minimum rotation is smaller, at least two light sources are needed to assure that one of the light sources will be visible during the rotation.

The above-described method depends on at least one of the receivers being able to measure the intensity of light received from a light source and the identity of that light source. A number of different schemes could provide the information in question. These schemes can be divided into two broad classes. In the first class, only one light source is turned on at a time. The pen cycles through the light sources in a predetermined order turning on one light source at a time for a predetermined period of time. In this case, the receiver need only identify the light source that is currently generating the signal that the receiver is measuring. There are a number of different methods for encoding the identity of the light source that is currently transmitting. For example, a light source can emit light in a pulse whose duration is unique for each light source. Hence, by measuring the length of the pulse that is detected at the receiver, the receiver can determine which of the light sources on the pen is transmitting the signal that it is receiving.

Similarly, each light source can transmit a binary coded sequence, a unique sequence being used for each light source. Each sequence could include a start pulse or start sequence that enables the receiver to synchronize its detection with the generation of the coded sequence.

In a third example, the pen transmits a start signal on all light sources. The start signal has a unique duration or pulse sequence. The individual light sources are then turned on one at a time for a predetermined time period followed by a predetermined dark time period. By measuring the delay from the start signal to the reception of the light signal at the receiver, the receiver can determine the identity of the light source that is currently being detected.

In the second class of schemes, all of the light sources are turned on at the same time; however, each light source transmits a pattern that is unique to that light source. The pattern is chosen such that the contribution to the combined signal from each light source can be determined at the receiver. For example, if each light source generates a pulse that is a single tone at a frequency that is unique to that light source, the receiver could utilize a set of band pass filters to separate the combined signal into the components from each light source.

In a second example of this class of detection scheme, each light source generates a signal that is a coded sequence of pulse that is unique to that light source. The code set is chosen such that the codes are orthogonal to one another, and hence, a set of finite impulse response filters can be utilized to separate the combined signal into the contributions from each light source. Code schemes of this type are known to the art, and hence, will not be discussed in detail here. For example, codes for use in code division multiplexing are routinely used in cellular telephone networks and digital subscriber loops for implementing data transmission over a telephone line.

The above-described embodiments of the present invention do not make use of the position of pen 50 on writing surface 40 in making a determination of the rotation angle of pen 50. The radiation pattern of each of the light sources on pen 50 can be measured. In one embodiment, this information is stored in controller 43. The expected intensity from each light source when that light source is at a known distance from the receivers can then be compared with the light intensity measured for each light source.

In the embodiments described above, a single light receiver is sufficient to determine an angle of rotation for the pen. If two light receivers are spaced apart from one another by a sufficient distant, two independent measurements of the pen rotation can be obtained. The angle of rotation of the pen relative to a line connecting the light receiver to the pen will be different from the two light receivers due to the spatial separation of the two light receivers. The difference in the angles of rotations measured by the light receivers provides an estimate of the position of the pen on the work surface.

The above-described embodiments of the present invention utilize light in the visible or infrared region of the optical spectrum. However, a source that emits electromagnetic radiation of other wavelengths could be utilized provided the emitted radiation pattern is directional. Accordingly, the term "light" will be defined to include any directional electromagnetic radiation unless a more specific range of wavelengths is indicated.

The embodiments described above utilize a "pen". However, it is to be understood that the pen could be replaced by any form of implement that simulates a handheld writing implement. The inclusion of a writing source that leaves a mark on the surface by depositing ink or an analogous material is optional. In simulated white board systems in which an image is projected on the writing surface and the "pen" coordinates are used to alter the image at the location of the pen, no such marks are needed or desired. Accordingly, the term pen is defined to include any handheld writing implement that provides coordinates to the tracking system when placed on the writing surface.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent to those skilled in the art from the foregoing description and accompanying drawings. Accordingly, the present invention is to be limited solely by the scope of the following claims.

What is claimed is:

1. An apparatus comprising:
a pen comprising an elongated body having a plurality of light sources arranged around an outer surface of said body, each light source being characterized by a unique identity; and
a pen controller that activates each light source to emit light such that said identity of that light source can be ascertained by a detector external to said apparatus, wherein the number of light sources is greater than or equal to 2 and said light sources are arranged such that at least one of said light sources is visible to said detector at any time.

2. The apparatus of claim 1 further comprising an acoustical transmitter that emits a sound pulse in response to a signal from said pen controller.

3. The apparatus of claim 1 wherein said elongated body comprises a cavity adapted for holding a writing implement having a writing tip that extents from said cavity.

4. The apparatus of claim 1 wherein said pen controller activates said light sources one at a time in a predetermined order.

5. The apparatus of claim 4 wherein each light source is modulated with a unique code when that light source is activated.

6. The apparatus of claim 4 wherein each light source is activated for a different length of time, said length of time being indicative of said identity of that light source.

7. The apparatus of claim 4 wherein said pen controller activates all of said light sources simultaneously for a first period of time prior to said pen controller activating each light source in said predetermined order.

8. The apparatus of claim 1 wherein said pen controller activates all of said light sources simultaneously and wherein each light source is modulated with a unique code that can be detected in the presence of codes from the others of said light sources.

9. The apparatus of claim 1 further comprising:
a first light receiver comprising a photodetector adapted to receive light from said light sources; and
a receiver controller that measures an intensity of light received from a first one of said light sources and determines said identity of that light source, said receiver generating an estimate of an angle of rotation of said pen relative to a predetermined direction on a writing surface.

10. The apparatus of claim 9 wherein said receiver controller measures an intensity of light received from a second one of said light sources, determines said identity of that light source and utilizes that measured intensity in providing said estimate of said angle of rotation.

11. The apparatus of claim 9 further comprising a second light receiver comprising a photodetector adapted to receive light from said light sources, said second light receiver being displaced relative to said first light receiver such that said second light receiver receives light from a second one of said light sources that is different from said first one of said light sources, said receiver controller measuring an intensity of light received from said second one of said light sources and utilizing that measurement in generating said estimate of said angle of rotation.

12. The apparatus of claim 11 wherein said receiver controller determines an estimate of a location for said pen relative to said first light receiver.

13. The apparatus of claim 12 wherein said receivers utilizes a measured intensity of light from each of said first and second light sources to determine said estimate of said location.

14. The apparatus of claim 11 wherein said pen transmits sound pulses and wherein said first and second light receivers comprise sound receivers for receiving said sound pulses generated by said pen, said receiver controller determining a position of said pen relative to said first and second light receivers from said received sound pulses.

15. A method for determining a rotation of a pen relative to a fixed reference orientation, said method comprising:
   providing a plurality of light sources arranged around an outer surface of said pen, each light source being characterized by a unique identity;
   causing each light source to emit light such that said identity of that light source can be ascertained by measuring said emitted light;
   detecting said emitted light at a location external to said pen; and
   estimating a rotation angle for said pen relative to said fixed reference orientation, wherein the number of said light sources is greater than or equal to 2.

16. The method of claim 15 wherein each light source is activated one at a time in a predetermined order.

17. The method of claim 16 wherein each light source is modulated with a unique code when that light source is activated.

18. The method of claim 16 wherein each light source is activated for a different length of time, said length of time being indicative of said identity of that light source.

19. The method of claim 16 wherein all of said light sources are activated simultaneously for a first period of time prior to activating each light source in said predetermined order.

20. The method of claim 15 wherein all of said light sources are activated simultaneously and wherein each light source is modulated with a unique code that can be detected in the presence of codes from the others of said light sources.

21. The method of claim 15 comprising:
   measuring an intensity of light received from a first one of said light sources; determining said identity of that light source; and generating said estimate of an angle of rotation of said pen relative to said fixed reference direction utilizing said determined identity.

22. The method of claim 21 comprising measuring an intensity of light received from a second one of said light sources; determining said identity of that light source; and utilizing that measured intensity in providing said estimate of said angle of rotation.

23. The method of claim 22 further comprising determining an estimate of a location for said pen relative to said first light receiver.

24. The apparatus of claim 23 wherein said estimate of said location utilizes a measured intensity of light from each of said first and second light sources.

25. An apparatus comprising:
   a pen comprising an elongated body having a light source that emits light having an intensity that varies as a function of a rotation angle with respect to a reference direction in a plane perpendicular to said elongated body; and
   a pen controller that determines said rotation angle and/or a direction of rotation of said elongated body from measurements of said intensity of light.

26. The apparatus of claim 25 further comprising an acoustical transmitter that emits a sound pulse in response to a signal from said pen controller.

27. The apparatus of claim 25 wherein said elongated body comprises a cavity adapted for holding a writing implement having a writing tip that extents from said cavity.

* * * * *